(12) United States Patent
Williams et al.

(10) Patent No.: US 9,052,337 B2
(45) Date of Patent: Jun. 9, 2015

(54) METHOD FOR HEIGHT CONTROL FOR SINGLE ELECTRON TUNNELING FORCE SPECTROSCOPY AND DYNAMIC TUNNELING FORCE MICROSCOPY

(71) Applicant: The University of Utah Research Foundation, Salt Lake City, UT (US)

(72) Inventors: Clayton Covey Williams, Salt Lake City, UT (US); Jon Paul Johnson, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 14/448,828

(22) Filed: Jul. 31, 2014

(65) Prior Publication Data

US 2014/0366228 A1    Dec. 11, 2014

Related U.S. Application Data

(63) Continuation of application No. PCT/US2013/024196, filed on Jan. 31, 2013.

(60) Provisional application No. 61/593,133, filed on Jan. 31, 2012.

(51) Int. Cl.
| | |
|---|---|
| *G01Q 10/06* | (2010.01) |
| *G01Q 60/12* | (2010.01) |
| *B82Y 35/00* | (2011.01) |

(52) U.S. Cl.
CPC ............... *G01Q 10/065* (2013.01); *B82Y 35/00* (2013.01); *G01Q 60/12* (2013.01)

(58) Field of Classification Search
USPC .................................. 850/4, 23, 33; 73/105
See application file for complete search history.

(56) References Cited

U.S. PATENT DOCUMENTS

| | | | |
|---|---|---|---|
| 6,845,655 B2 * | 1/2005 | van der Weide et al. | ........ 73/105 |
| 7,574,327 B2 * | 8/2009 | de Roover et al. | ............ 702/189 |
| 2010/0128342 A1 * | 5/2010 | Abramovitch | ................ 359/325 |
| 2011/0247106 A1 | 10/2011 | Humphris | |
| 2011/0289635 A1 | 11/2011 | Burns et al. | |
| 2011/0296561 A1 | 12/2011 | Humphris et al. | |

OTHER PUBLICATIONS

International Search Report Issued in PCT/US2013/024196 on May 15, 2013.
Johnson, Jon Paul, "Dynamic Tunneling Force Microscopy and Single Electron Tunneling Force Spectroscopy", Department of Physics and Astronomy the University of Utah, Aug. 2010 pp. 18-27.

* cited by examiner

*Primary Examiner* — Kiet T Nguyen
(74) *Attorney, Agent, or Firm* — Stoel Rives LLP

(57) ABSTRACT

Height control systems and/or methods are implemented for dynamic force tunneling microscopy and single electron tunneling force spectroscopy to improve their accuracy.

10 Claims, 13 Drawing Sheets

METHOD FOR HEIGHT CONTROL FOR SINGLE ELECTRON TUNNELING FORCE SPECTROSCOPY AND DYNAMIC TUNNELING FORCE MICROSCOPY

RELATED APPLICATIONS

This application is a continuation of International Patent Application No. PCT/US2013/024196, filed Jan. 31, 2013, which claims the benefit of U.S. Provisional Patent Application No. 61/593,133, filed Jan. 31, 2012, both of which are herein incorporated by reference in their entirety, including attachments and appendices.

FEDERALLY SPONSORED RESEARCH OR DEVELOPMENT

This invention was made with U.S. Government support under grant number FA95550-06-1-0100 from the United States Air Force. The U.S. Government may have certain rights in this invention.

TECHNICAL FIELD

This application relates to tunneling force microscopy and tunneling force spectroscopy and, in particular, to methods and apparatus for height control feedback to enhance the imaging and spectroscopic capabilities of the techniques.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION OF EMBODIMENTS

Figure 1:
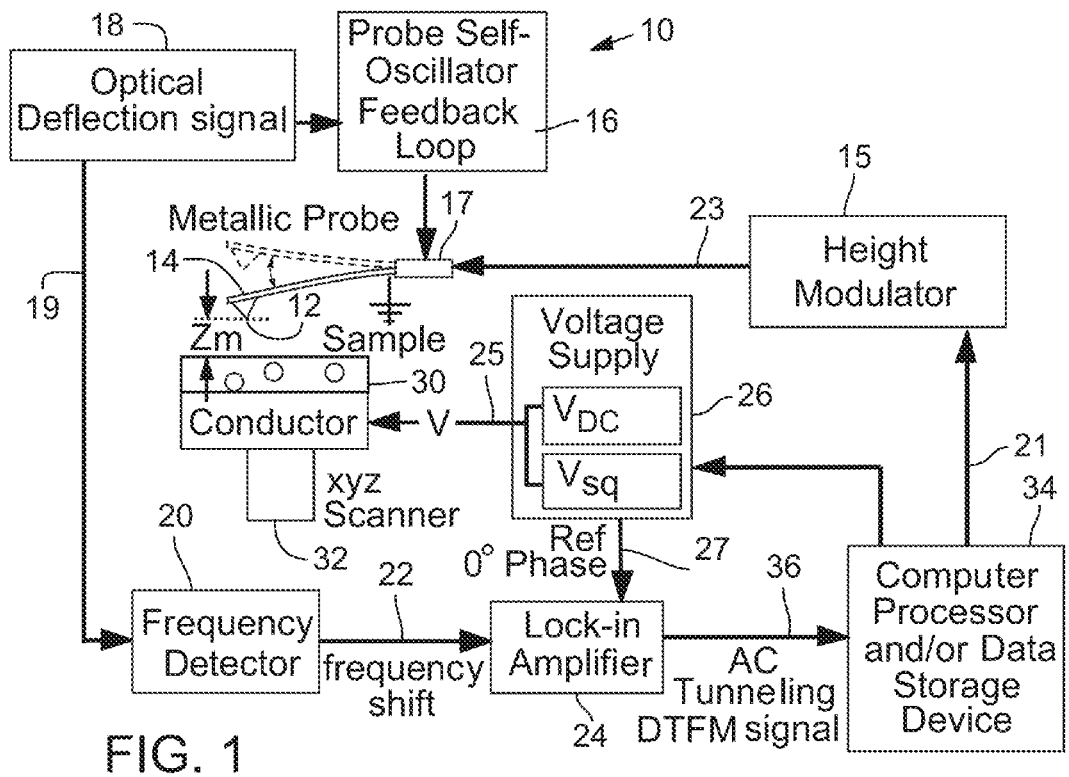
FIG. 1 is a simplified diagram of a dynamic tunneling force microscopy (DTFM) system for investigating a sample.

Electronic trap states in dielectric materials significantly influence the reliability and performance of electronic devices. Electron traps occur in many forms. In silicon dioxide for example, an exemplary electron trap may be formed where a silicon atom is bonded to only three oxygen atoms (i.e., one oxygen atom absent). The oxygen vacancy can capture an electron and cause a defect. Moreover, electron traps in gate oxides degrade device performance and reliability by shifting threshold voltage, increasing leakage current, and reducing mobility in the channel.

Newly developed techniques associated with electron tunneling force microscopy and spectroscopy enhance an atomic scale understanding of the spatial distribution and energies of electron traps found in sample dielectric materials. In some embodiments, the sample dielectric material has a conductivity that supports a current of less than 1 femto-amp (fa) ($<10^4$ electron/second). In some embodiments, the sample dielectric material has a conductivity that supports a current of less than 0.1 fa. In some embodiments, the sample dielectric material has a conductivity that supports only a current of less than 0.01 fa. In some embodiments, the sample dielectric material 30 may have no conductivity at all. The sample dielectric material may be a high-k dielectric material. The sample dielectric material may alternatively be a low-k dielectric material. Exemplary sample dielectric materials may be films of a silicon oxide, hafnium oxide, or other metallic oxide. Other suitable sample dielectric materials include, but are not limited to, $HfSiO_x$, SiOF, SiOB, SiCOH, and diamond. It will be appreciated that molecules disposed on the top surface of dielectric materials can also be evaluated.

Electron tunneling force microscopy is presented herein only by way of example to dynamic tunneling force microscopy (DTFM) and electron tunneling force spectroscopy is presented herein only by way of example to single electron tunneling force spectroscopy (SETFS), both of which rely on the electrostatic force detection of electrons that are shuttled between a probe tip and a sample dielectric material. The operative accuracy of electron tunneling achievable by these techniques is affected by variations in the distance of the gap between an atomic force microscopy (AFM) probe tip and the sample dielectric material. Moreover, the local slope or topographic variations of the surface of the sample dielectric material, the thermal drift associated with a positioner of the sample or the AFM probe tip, such as one or more piezoelectric scanner tubes, and/or temperature variations can greatly impact the tunneling data acquired and its interpretation. For example, electron tunneling probability typically varies by an order of magnitude per 0.1 nm change in the gap height. Because typical DTFM image acquisition may require about five minutes depending on the size of the sample, a thermal drift rate of less than about 0.1 nm/minute may be desirable, for example, a drift rate of less than about 0.01 nm/minute; however such drift rates may be difficult to achieve or rely on.

Accordingly, determining and/or compensating for local variations in the topography of the surface of the sample dielectric material would be desirable. Similarly, determining and/or compensating for thermal drift would also be desirable. Several different methodologies developed to control probe tip height during DTFM imaging and spectroscopic measurements are, therefore, described. In particular, measurement methodology has been developed with respect to height control feedback to enhance the imaging and spectroscopic capabilities of electron tunneling techniques.

FIG. 1 shows an exemplary dynamic tunneling force microscopy system 10 including a metallic probe tip 12 that may be positioned toward the end of a cantilevered probe 14. With reference to FIG. 1, a probe self-oscillation feedback loop 16 and a mechanical actuator 17, such as a piezoelectric actuator, can be employed to oscillate the probe tip 12 at a selected frequency in response to an AC voltage provided by the probe self-oscillation feedback loop 16. The probe self-oscillation feedback loop 16 may maintain oscillation of the probe tip 12 at the resonance frequency of the probe arm 14 and maintain the oscillation at a constant amplitude as is done in dynamic force microscopy. An exemplary resonance frequency of the probe 24 may be between 1 kHz and 1 MHz or between 100 kHz and 500 kHz, and an exemplary amplitude may be between 0.1 nm and 100 nm, between 10 nm and 30 nm, or between 0.1 nm and 10 nm.

The DTFM system 10 also may include a probe height modulator 15 that receives a control signal 21 and provides a probe-gap modulation signal 23 ($Z_m$) to the mechanical actuator 17 of probe 14 to provide an oscillation frequency of the probe height that is two times the frequency of a square wave voltage $V_{sq}$ provided by the voltage supply 26 to the sample dielectric material 30. The voltage supply 26 causes the square wave voltage $V_{sq}$ to exist between the sample dielectric material 30 and the probe tip 12. An exemplary frequency provided by the probe height modulator 15 may be between 50 Hz and 50 kHz or between 100 Hz and 1 kHz, and an exemplary amplitude may be between 1 nm and 5 nm.

It will be appreciated that the oscillation of the probe 14 at or near its resonance frequency as provided by the probe self-oscillation feedback loop 16 is distinct from the oscillation frequency of the probe height provided by the probe height modulator 15, and that these frequencies may have very different values and may be applied to the probe concurrently. In one example, the probe self-oscillation feedback loop 16 may provide a frequency of hundreds of kilohertz and the probe height modulator 15 may provide a frequency of hundreds of hertz.

In some modes, a frequency shift detection system 19, which includes an optical deflection signal 18 that cooperates with a frequency shift detector 20 to determine frequency shifts in the oscillating probe tip 12. Typically, the deflection of the probe 14 is measured using a laser reflected from the top surface of the cantilever probe arm into an array of photodiodes. Other methods that can be used include optical interferometry, capacitive sensing or piezoresistive AFM cantilevers. These cantilever probes 14 may also be fabricated with piezoresistive elements that act as a strain gauge.

A frequency shift signal 22 from the frequency detector 20 can be fed to a lock-in amplifier 24 that also receives from a voltage supply 26 an AC reference voltage signal 27. The voltage supply 26 also provides voltage 25 to a sample dielectric material 30 supported by an xyz positioner 32. Relative movement between the probe tip 12 and the surface of the sample dielectric material 30 can be accomplished by movement of the probe tip 12 (such as by piezo-electric actuator(s)), movement of the sample dielectric material 30 (such as by movement of the scanner 32), or by movement of both the probe tip 12 and the sample dielectric material 30. The movement of the probe tip 12 and the sample dielectric material 30 can be simultaneous and controlled as integrated movements or can be discrete movements of the probe tip 12 and the sample dielectric material 30, or the movements of the probe tip 12 and the sample dielectric material 30 can be performed at separate times. Moreover, in some embodiments, one of the probe tip 12 and the xyz positioner 32 can make the z movements while the other of the probe tip 12 and the xyz positioner 32 can make the x and y movements.

The voltage supply 26 can provide both a quasi DC voltage ($V_{DC}$) that functions to adjust the average voltage on the sample during DTFM measurements to compensate for surface potential variations at different locations on the sample dielectric material 30. For convenience the quasi DC voltage may be referred to as DC voltage or $V_{DC}$. The voltage supply 26 can also provide a square wave voltage ($V_{sq}$) used to shuttle electrons to and from the surface of the sample dielectric material 30. Moreover, the AC reference voltage signal 27 provided to the lock-in amplifier 24 is typically at the frequency of a square wave applied between the probe tip 12 and the sample dielectric material 30. The square wave voltage is turned off for tunneling measurements. These voltages may be added together at the voltage supply and delivered by a common electrical line 25 as shown in FIG. 1. The $V_{DC}$ and $V_{sq}$ voltages need not be supplied from a common voltage supply 26. Furthermore, a person having skill in the art with the aid of the present disclosure would recognize that the $V_{DC}$ and $V_{sq}$ voltages could alternatively be applied to the probe 14 instead of to the sample dielectric material 30. The voltage supply 26 may receive instructions from one or more computer processors and/or data storage devices 34. Moreover, some or all of the other components may be in communication with, controlled by, or supply information to one or more computer processors and/or data storage devices 34.

An exemplary square wave voltage $V_{sq}$ may be between +10 V and −10 V, +5 V and −5 V, +3 V and −3 V, or +2 V and −2 V, and the square wave frequency may be less than 5 kHz, 1 kHz, or 500 Hz and/or greater than 50 Hz, 100 Hz, or 300 Hz. The smallest tip-sample gap employed for tunneling may be greater than or equal to 0.1 nm or 0.2 nm and/or less than 1 nm, 0.8 nm, 0.6 nm, or 0.5 nm. The largest tip-sample gap employed for tunneling may be less than or equal to 4 nm, 3 nm, or 2 nm. An exemplary range for the voltage $V_{DC}$ may be between +100 V and −100 V, +25 V and −25 V, +115 V and −115 V, +10 V and −10 V, +5 V and −5 V, +3 V and −3 V, or +1 V and −1 V.

Figure 2:
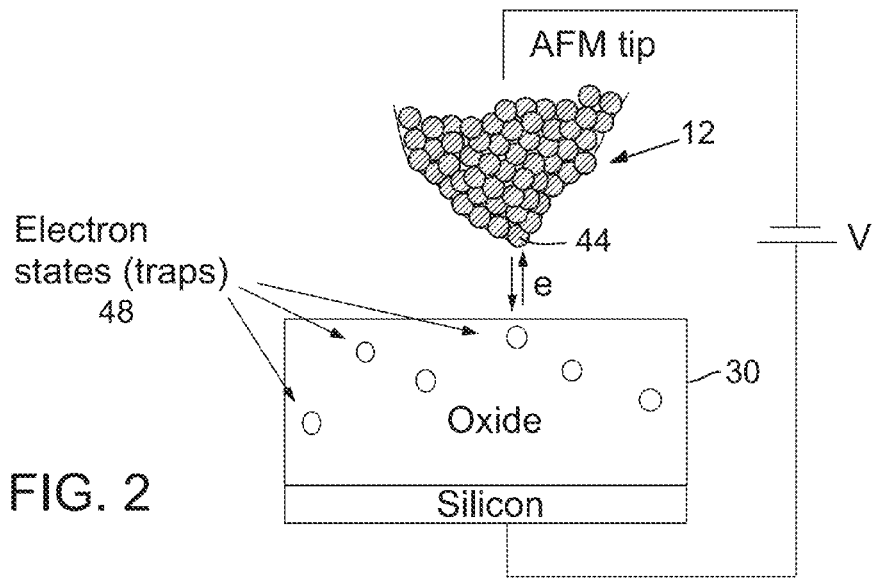
FIG. 2 is simplified diagram showing an enlarged probe tip of the DTFM system shown in FIG. 1.

FIG. 2 shows an exemplary enlarged probe tip 12 of the DTFM system 10. The probe tip 12 may be made from a metallic material and may have a generally conical shape. In some embodiments, the probe tip 12 can have a shape that has hyperbolic curve or a reverse hyperbolic curve. In some exemplary embodiments, the probe tip 12 may terminate in a single exposed atom 44 of a metal.

Figure 3:
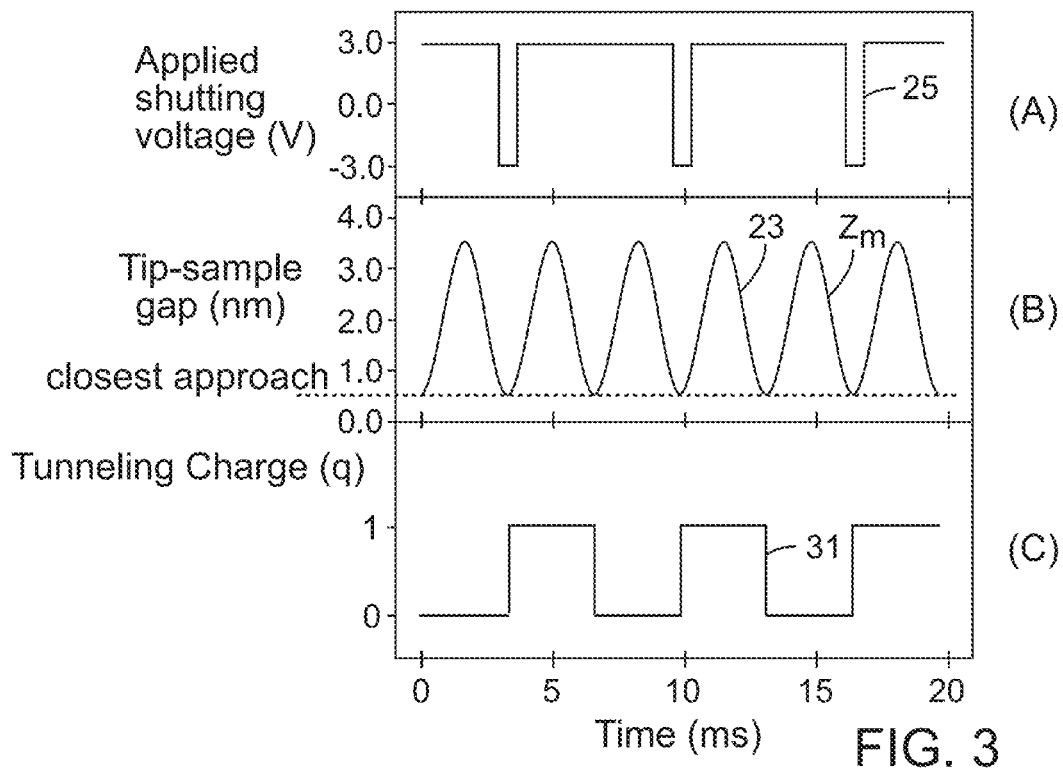
FIG. 3 is a diagram illustrating exemplary DTFM timing waveform relationships of shuttling voltage, height modulation, and tunneling charge.

With respect again to the DTFM system 10, FIG. 3 illustrates exemplary timing waveform relationships of (A) the applied voltage 25 (which may be the sum of $V_{DC}$ and $V_{sq}$), (B) gap height (Zm), and (C) tunneling charge 31 correlated with changes in the gap height (Zm) between the probe tip 12 and the sample dielectric material 30. With reference to FIGS. 1-3, an exemplary applied voltage waveform 25 from the voltage supply 26 is applied to the sample dielectric material 30. A probe-gap modulation signal 23 applied to the actuator 17 of the probe 14 moves the probe tip 12 into and out of tunneling range at twice the frequency of the voltage waveform to correlate with changes in the waveform of the applied voltage 25. Each time the probe tip 12 is brought into tunneling range, the polarity of the applied voltage 25 has changed so that electrons are shuttled to or from the probe tip 12 from or to the sample dielectric material 30. The lock-in amplifier 24 permits low frequency charge fluctuations at the surface of the sample dielectric material 30 (not caused by shuttled electrons) to be filtered out, leaving a DTFM signal 36 that is sensitive only to changes happening at the frequency of the applied voltage 25.

Figure 4:
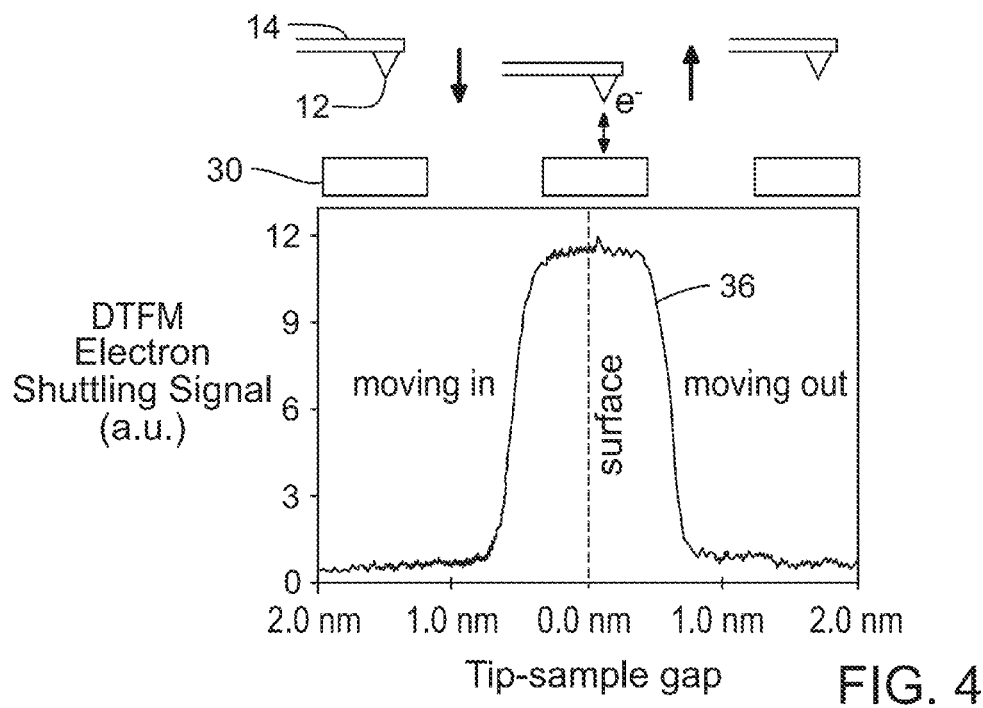
FIG. 4 is an exemplary graph of a measured DTFM signal showing electron tunneling versus gap height of the probe tip above the sample.

The DTFM signal 36 is proportional to the number of electrons that are shuttling as shown in FIG. 4, which is an exemplary graph of electron tunneling (atomic units) versus the gap height (Zm) of the probe tip 12 above the sample dielectric material 30. FIG. 4 illustrates that as the probe tip 12 is brought close enough to the surface of the sample dielectric material 30 so that electron shuttling is consistent, the DTFM signal 36 rises. The DTFM signal 36 then falls as the probe tip 12 is brought out of tunneling range.

With the DTFM correlated waveforms applied, the probe tip 12 is raster scanned laterally over the surface of the sample dielectric material 30 to obtain a map of the DTFM signal 36 at each location. Such a shuttling map provides an image of the density of available trap states that are within tunneling range for the voltage range ($V_{sq}$) used to shuttle the electrons. Greater details concerning DTFM can be found in U.S. Pat. No. 7,420,106, which is herein incorporated by reference.

One issue with DTFM imaging is that no known feedback method exists for controlling the height of the probe tip 12 as it is raster scanned during DTFM image acquisition. As noted earlier, the tunneling probability varies with the relative gap height; moreover, the tunneling probability typically varies by an order of magnitude per 0.1 nm gap change, and drift is difficult to control. Thus, the local slope of the surface of the sample dielectric material 30 and the thermal drift of the components of the DTFM system 10, particularly the thermal drift associated with the mechanical actuator 17 such as a piezoelectric scanner tube, can greatly impact the interpretation of the data acquired. Because typical DTFM image acquisition takes approximately 5 minutes, depending on a number of variables including sample size, a drift rate of less than about 0.1 nm/minute is desirable, and a drift rate of less than about 0.01 nm/minute is more desirable. Similarly, compensation for variations in the local slope of the surface of the sample dielectric material 30 is also desirable. Accordingly, several methodologies developed to control the height of the probe tip 12 during DTFM imaging are described with reference to an exemplary DTFM system 50 for implementing these methodologies.

Figure 5:
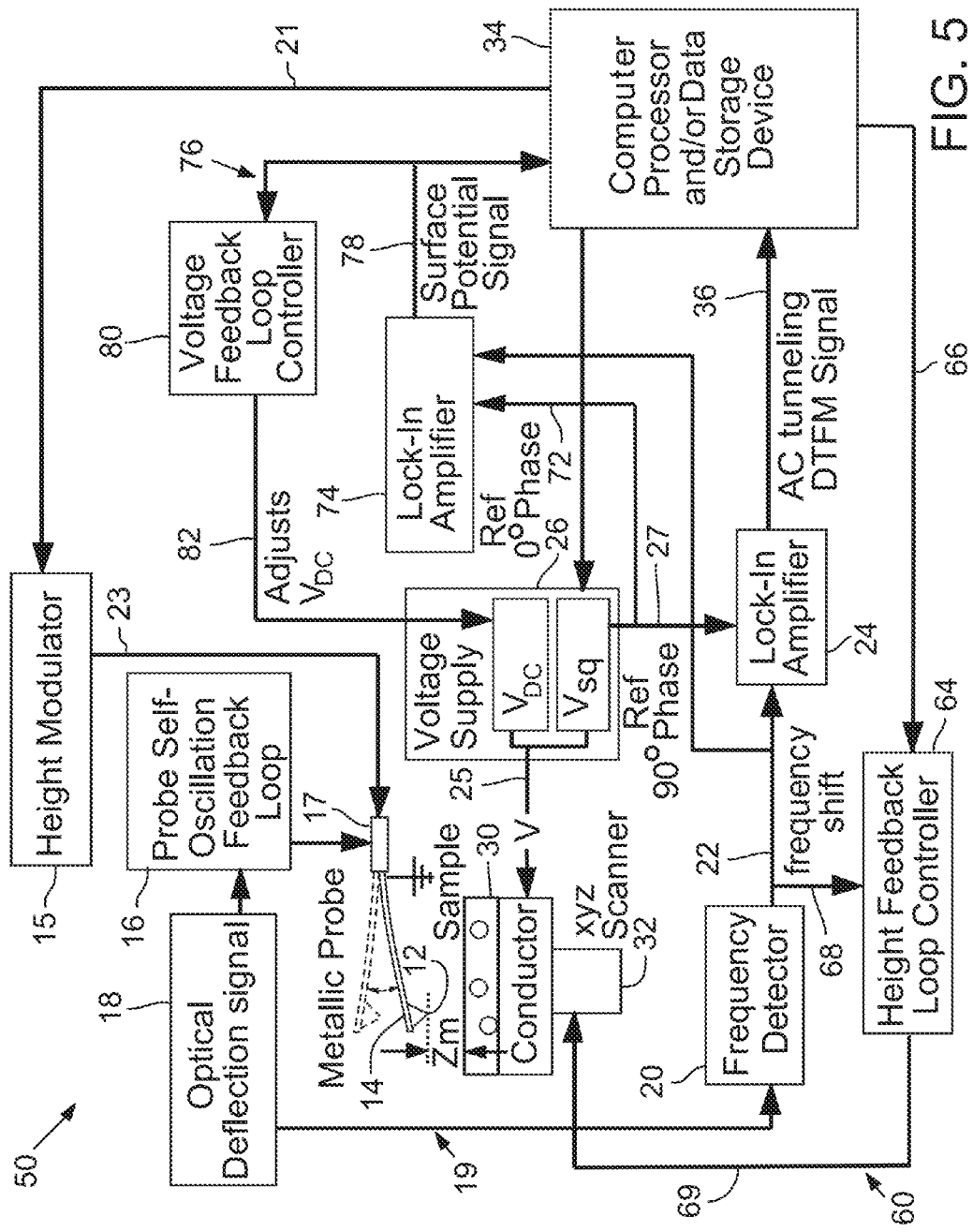
FIG. 5 is a simplified diagram of a DTFM system employing a height control feedback loop and a voltage control feedback loop.

FIG. 5 is a simplified diagram of a DTFM system 50 employing a height control feedback loop 60 and a voltage control feedback loop 76. The DTFM system 50 shown in FIG. 5 employs many components analogous to those employed in the DTFM system 10 shown in FIG. 1. Accordingly, the analogous components are labeled with the same reference numerals to expedite description. With reference to FIGS. 1 and 5, several of the differences can be readily elucidated.

For example, the $V_{sq}$ reference voltage signal 27 delivered from the voltage supply 26 to the lock-in amplifier 24 may be phase shifted by 90 degrees. The voltage supply 26 also delivers a $V_{sq}$ reference voltage signal 72 (zero degrees phase shifted) to a lock-in amplifier 74 which forms part of the voltage feedback loop 76. The voltage feedback loop 76 permits the DTFM system 50 to keep the probe tip 12 at the same average surface potential as the average surface potential of the surface of the sample dielectric material 30. In particular, the lock-in amplifier 74 outputs a surface potential signal 78 that is proportional to the difference between the average surface potential of the probe tip 12 and the average surface potential of the sample dielectric material 30. The surface potential signal 78 from the lock-in amplifier 74 is sent to a voltage feedback loop controller 80 (proportional or integral or differential), where the surface potential is compared to a set point (in this example the set point may be zero). The voltage feedback loop controller 80 then sends a DC feedback adjustment signal 82 to the voltage supply 26, which adds an additional DC voltage along electrical line 25 applied to the sample dielectric material 30 to compensate for differences in surface potential between probe tip 12 and the sample dielectric material 30. Moreover, the feedback adjustment signal 82, therefore, permits the voltage feedback loop 76 to adjust the voltage applied to the sample dielectric material 30 so that the lock-in amplifier 74 always reads zero (or some other predetermined voltage), for example, so that the probe tip potential will be maintained at the same potential as the selected location on the surface of the dielectric material 30. By keeping the probe tip 12 at the same average potential as the average potential of the dielectric surface, the DTFM system 50 can eliminate or compensate for background charge variations and anomalies so that height control of the probe tip 12 relative to the surface of the sample dielectric material 30 can be more effective. It will be appreciated that the output voltage 82 of the voltage feedback loop controller 80 can be sent to the computer 34 to acquire a surface potential image when the voltage feedback loop controller 80 is turned on.

Another difference with the DTFM system 10 is that the DTFM system 50 includes the height control feedback loop 60. The height control feedback loop 60 includes a height control feedback loop controller 64 that receives a set point frequency instruction signal 66, such as directly or indirectly from a user or a computer such as the computer processor and/or storage device 34. The height control feedback loop controller 64 also receives a frequency shift information signal 68 directly or indirectly from the frequency detector 20. The frequency shift information signal 68 may be the same as the frequency shift signal 22. The height feedback loop controller 64 provides a height compensation signal 69 to the xyz scanner 32 to adjust the elevation of the surface of the sample dielectric material 30 with respect to the frequency set point to establish a predetermined height of the probe tip 12 with respect to the surface of the sample dielectric material 30 as the probe tip 12 scans across the surface or is stationary.

Figure 6:
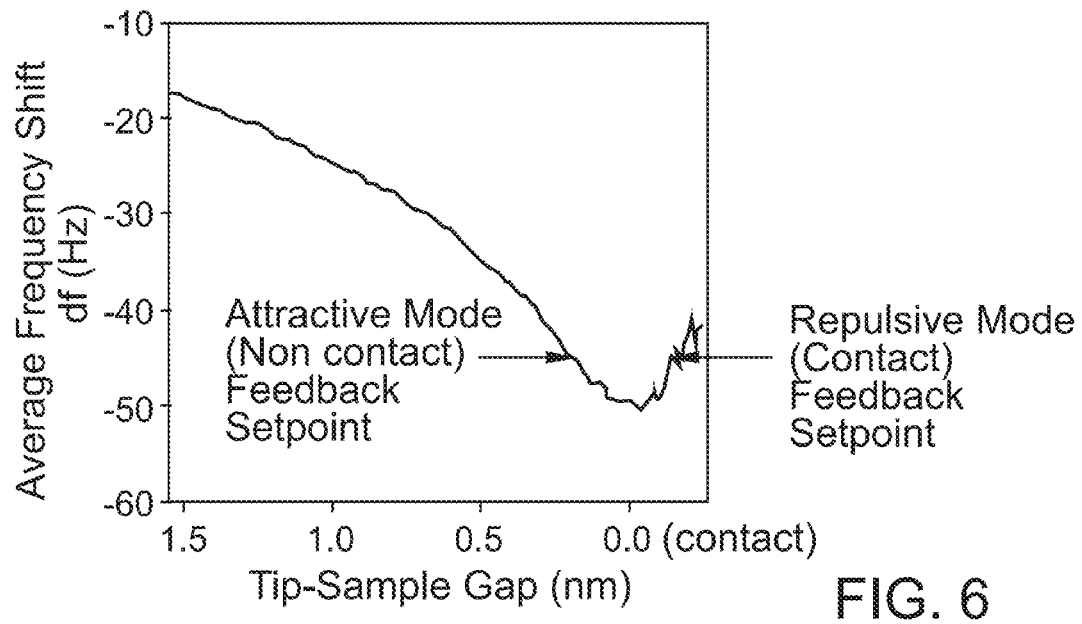
FIG. 6 is a graph of average frequency shift versus tip-sample gap illustrating an exemplary contact feedback set point and an exemplary noncontact feedback set point.

This height feedback method is based on the fact that even with the DTFM probe-gap modulation signal 23 applied to the probe tip 12, when the probe tip 12 is pushed toward the surface of the sample dielectric material 30, the average frequency shift of the cantilever probe 14 begins to change as shown in FIG. 6. Moreover, the probe tip 12 need not be brought into actual physical contact with the surface of the sample dielectric material 30 to implement this method of height control feedback. Because the average frequency shift of the probe 14 begins to change as the probe tip 12 descends toward or ascends away from the surface of the sample dielectric material 30, a frequency shift set point can be selected. The frequency shift of the probe 14 decreases during the descent toward the surface of the sample dielectric material 30, so in an "attractive mode," and such a set point can be employed for reference of the probe tip 12 to the elevation of the surface of the sample dielectric material 30. The frequency shift of the probe 14 increases if the probe is pushed further toward the surface of the sample dielectric material 30, so in a "repulsive mode," and such a set point can be employed for reference of the probe tip 12 to the elevation of the surface of the sample dielectric material 30. The repulsive mode can also be referred to as "contact mode" because the selected set point occurs after the probe tip 12 would "touch" the surface of the sample dielectric material 30. The attractive mode can also be referred to as "noncontact mode" because the selected set point occurs before the probe tip 12 would "touch" the surface of the sample dielectric material 30.

Although a positive or negative set point for feedback control of less than or equal to about 10 Hz is generally desired, other set points may be employed. For example, a positive or negative set point of between 1 Hz and 10 Hz may be employed. However, the positive or negative set point can be less than or equal to 5 Hz, 2 Hz, or 1 Hz. Alternatively, the positive or negative set point can be less than or equal to 10 Hz and greater than or equal to 5 Hz, 2 Hz, or 1 Hz. For some applications, a much larger value for the set point may be desirable, such as from about 10 Hz up to about 100 Hz.

Figure 7:
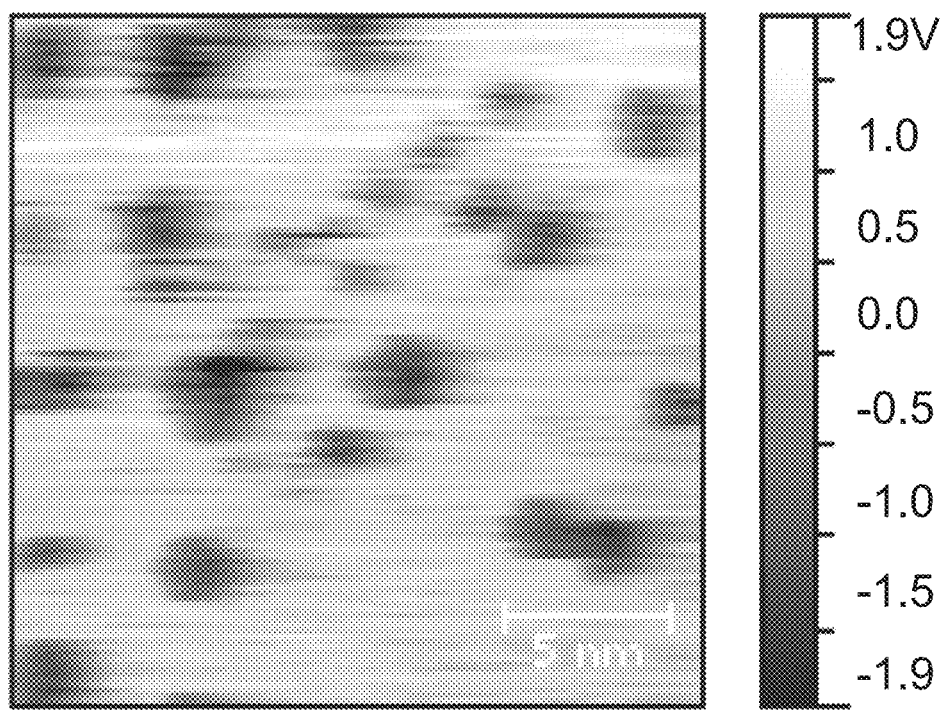
FIG. 7 is a DTFM image made with height control feedback in an attractive mode.

FIG. 6 is a graph of average frequency shift versus tip-sample gap illustrating an exemplary repulsive mode feedback set point and an exemplary attractive mode feedback set point. As shown in FIG. 6, the set point for the feedback loop can be set on the ascending slope in repulsive mode or on the descending slope in attractive mode of the frequency shift curve. With a suitably chosen frequency shift set point and a height control feedback loop 64 of suitable time duration, a simultaneous height feedback signal and DTFM signal is possible. FIG. 7 is a DTFM image made with height control feedback in an attractive mode. The dark spots in the image are trap states.

Figure 8:
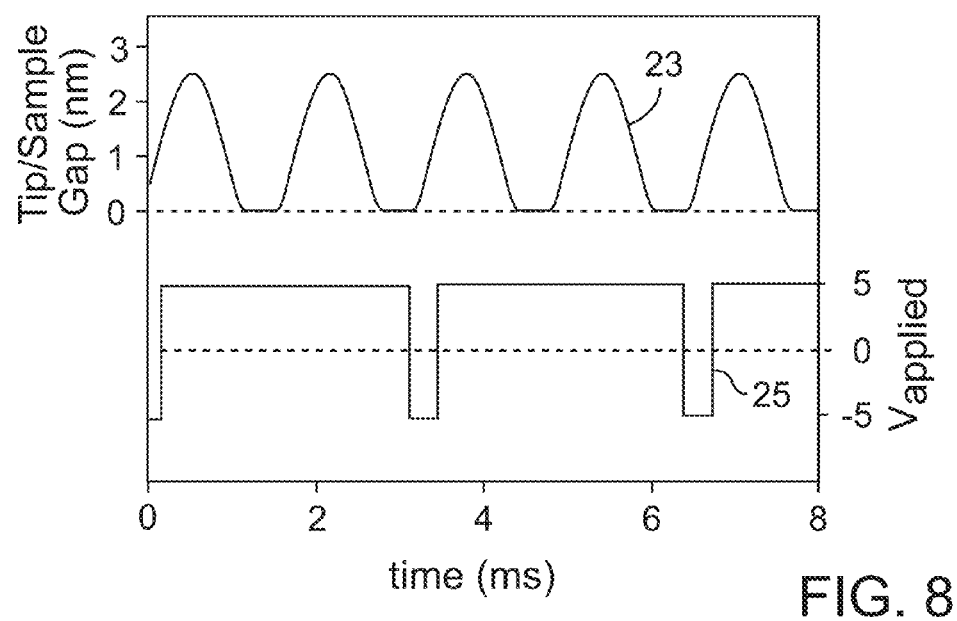
FIG. 8 is an exemplary graph of tip-sample gap versus time correlated with a graph of the applied shuttling voltage versus time.

FIG. 8 is an exemplary graph of tip-sample gap versus time correlated with a graph of the applied shuttling voltage 25 versus time for an example in which the probe tip 12 is making repulsive contact with the surface of the sample dielectric material 30. The tip-sample gap graph in FIG. 8 illustrates surface "contact" with each approach of the probe tip 12. FIG. 8 also shows that the polarity of the applied shuttling voltage 25 is switched after each surface "contact" approach, enabling simultaneous DTFM electron shuttling and height control. The height control feedback loop 60 can be set to a low pass filter frequency shift signal 68 so that only the average frequency shift is seen by the height control feedback loop 60. In such an example, the frequency shift signal 68 may differ from the frequency shift signal 22. Although employing a repulsive mode set point can offer great height control accuracy, employing an attractive mode set point may be more advantageous for some embodiments because the approach of the probe tip 12 can be curtailed farther from the surface and the feedback loop 60 might be able to operate with a gentler interaction with the surface.

With reference again to FIG. 3, the AC voltage 25 may be for example a square wave AC voltage in the range of about 0.1 to 10 V. In this example, the gap height is controlled by a gap height signal 23 and is modulated at a frequency that is twice the frequency of the AC voltage 25 that is electrically modulating the probe 14. The gap height may be modulated up and down by 2 to 3 nm (or any range of at least 1 nm within the range of 0.5 to 5 nm) in a sinusoidal motion. The state charge 31 is a representation of the surface potential of the sample dielectric material 30. Additional embodiments can be found in U.S. Pat. No. 7,420,106, which is hereby incorporated by reference, can be modified with this contact based feedback loop and methodology.

A "point lift" method of height control involves first finding the height of the surface of the sample dielectric material 30 over each location using a non-contact or contact height control feedback loop 60 with the DTFM voltages and the height modulator 80 turned off, then disabling the height control feedback loop 60, and lifting the probe tip 12 to a known height and turning the DTFM voltages and height modulator on again at each location. The height control feedback loop 60 may also offer a tradeoff between tunneling height accuracy and scan speed. Specifically, increasing the speed of the height feedback loop allows for quicker determination of sample height and, hence, less time taken per location. However, increasing the speed of the feedback loop may result in more relative uncertainty in height (due to increased noise for example). Another tradeoff offered by the height control feedback loop 60 is that on applying the DTFM waveforms after lifting the probe tip 12, the DTFM signal may take some time to settle down, due to transients that occur. The time scale for this settling is equivalent to several time constants of the DTFM lock-in amplifier 24 (typically 10-100 ms). The time settling, along with a slow loop speed, may make imaging in this method slower than DTFM with the feedback loop disabled or than DTFM with continuous height feedback control as described with respect to FIG. 5. The height of the probe tip 12 to the surface of the sample dielectric material 30 can be controlled to within 0.1 nm, 0.05 nm, or 0.01 nm of the true height, or better.

Figure 9:
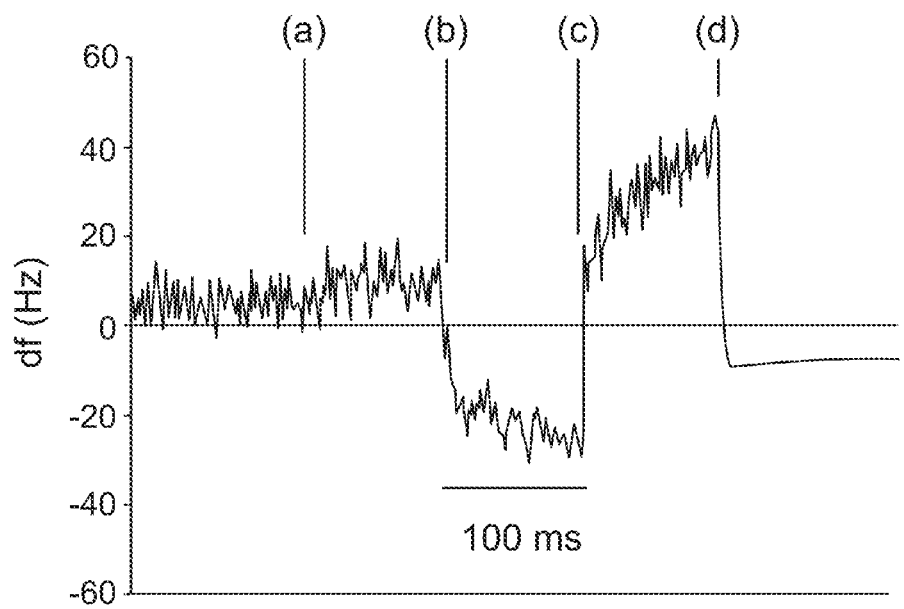
FIG. 9 is a frequency versus time graph showing the frequency changes as the probe tip is moved toward or away from the surface by different step sizes.

FIG. 9 is a frequency shift versus time graph correlated with exemplary steps in probe height, illustrating that a measurable change in frequency shift is achieved for 0.1 nm height change in probe tip 12. With reference to FIG. 9, at a particular location, the feedback loop is disabled at time (a); the probe tip 12 is retracted from the surface of the sample dielectric material by 1 angstrom at time (b); then at time (c) the probe tip 12 is pushed 2 angstroms toward the surface of the sample dielectric material 30 from the previous elevation, and finally at time (d) the probe tip 12 is withdrawn 2 nm. Thermal drift is the likely explanation for the time varying df in the interval between time b and time c and the interval between time c and time d. Height can be controlled with an accuracy of better than one angstrom. For reference, the bandwidth of the df signal was 100 Hz for this measurement. It will be appreciated that the rate of drift in df may be dependent on whether the probe tip 12 is in the attractive region or the repulsive region.

For a "line lift" method of height control, the height for each line of an image is determined in the a scan using repulsive or attractive height control feedback by standard dynamic force microscopy but with the DTFM voltages and height modulation turned off. This first pass of a line lift mode method is shown in graph (a) of FIG. 10, which illustrates exemplary DTFM steps for height control in a line lift mode. The first pass thereby acquires the surface topography for the surface z(x) of a sample dielectric material 30 corresponding to the scan line. Then the tip is lifted to a known height and scanned in a second pass shown in graph (b) back across the line without feedback with the DTFM voltages and height modulation on, using the stored topographic data z(x) acquired during the first pass while the DTFM signal is recorded. The code to perform this function has been written in LABVIEW. This approach has advantages of reducing the number of transients and avoiding contact during DTFM imaging.

Figure 11:
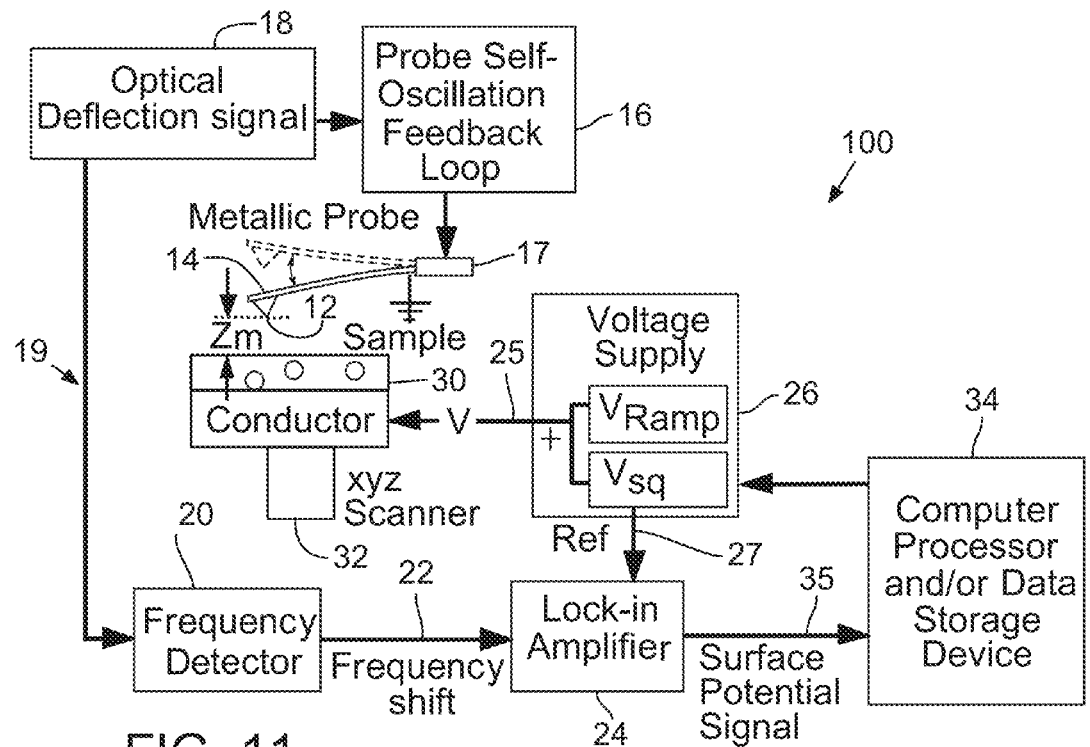
FIG. 11 is a simplified diagram of a single electron tunneling force spectroscopy (SETFS) system.

With reference to FIG. 11 which is a simplified diagram of SETFS system 100, SETFS can suffer from many of the same drift problems that have discussed previously with respect to DTFM. The SETFS system 100 shown in FIG. 11 employs many components analogous to those employed in the DTFM system 10 shown in FIG. 1. Accordingly, the analogous components are labeled with the same reference numerals to expedite description. With reference to FIGS. 1 and 11, several of the differences can be readily elucidated. In particular, the SETFS system 100 does not show a height modulator 15 as many of those functions can be incorporated in the probe self-oscillation feedback loop 16.

Additionally, the voltage supply 26 includes a $V_{Ramp}$ component instead of a $V_{DC}$ component. The $V_{ramp}$ component may provide discrete ramped DC voltages for successive tunneling measurement runs. The voltage 25 is applied between the probe tip 12 and the sample dielectric material 30 to change the injection or extraction voltage for tunneling. The dependence of the tunneling on the discrete $V_{Ramp}$ voltages applied between probe tip 12 and the sample dielectric material 30 forms the basis of the SETFS.

Figure 12:
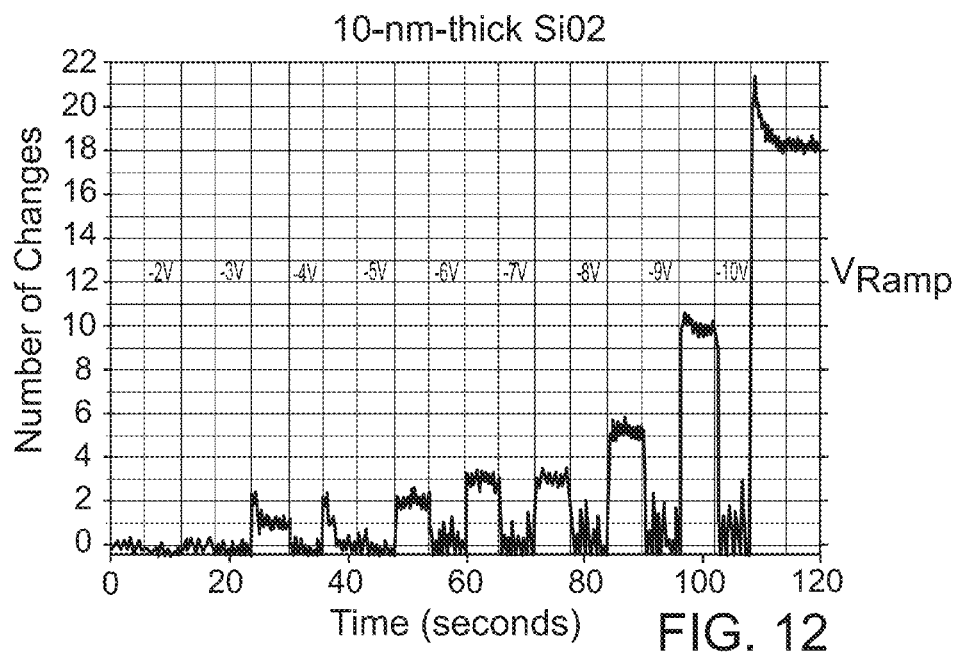
FIG. 12 is a graph of the number of electrons transferred verses applied voltage.

FIG. 12 is a graph of the number of electron charges transferred to the surface verses applied voltage from the $V_{ramp}$ component. With respect to FIG. 12, as the Fermi level of the tip is scanned past the energy of an empty (or filled) state in the oxide, the state will be occupied (or emptied) by the tunneling electron, if the tunneling probability is large enough.

FIG. 12 conveys that it is possible not only to tell whether states exist within tunneling range of the probe tip, but also one can determine the energies of those states. With careful control of the tip-sample gap, it is possible to scan the applied voltage and find out at which energies tunneling events are observed. As the Fermi level of the tip is scanned past the energy of an empty (filled) state in the oxide, the state will be occupied (emptied) by the tunneling electron, if the tunneling probability is large enough.

Figure 13:
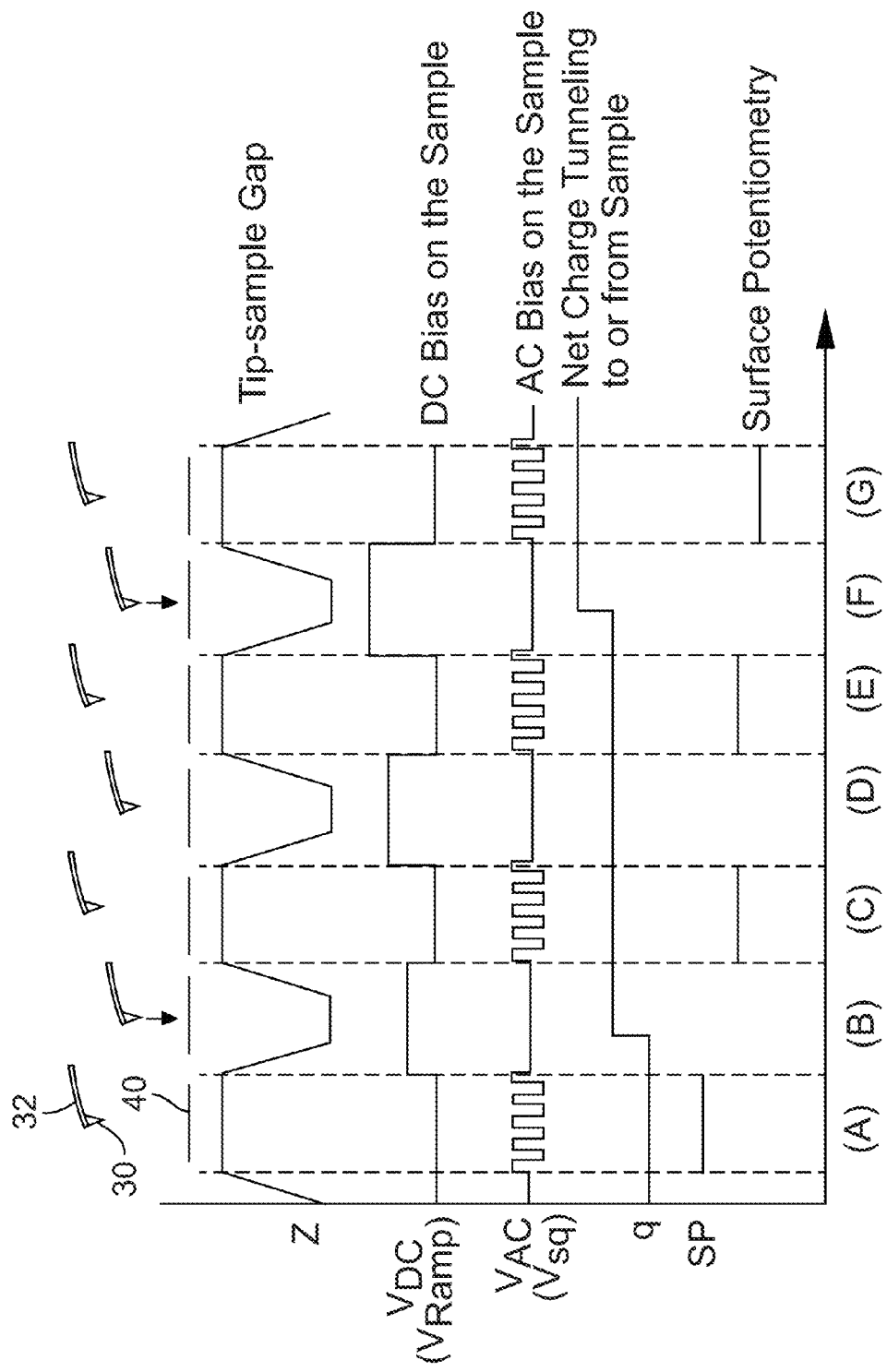
FIG. 13 is a diagram illustrating an exemplary relationship of the changes in applied voltage with the changes in tip-sample gap and tunneling charge, demonstrating an exemplary methodology for performing SETFS measurements.

FIG. 13 is a diagram illustrating an exemplary relationship of the changes in applied voltage with the changes of the tip-sample gap and demonstrating an exemplary methodology for performing SETFS measurements. The tip-sample gap versus applied voltage diagram of FIG. 13 provides an illustration of exemplary steps (A)-(G) of SETFS scans at different tip-sample voltages.

Toward the top of FIG. 13, the probe tip 12 is pictorially shown to be either in or out of tunneling range of the sample dielectric material 30. The graph of Z (with trapezoidal portions) indicates movement of the probe tip 12 to set its height with respect to the surface of the sample dielectric material 30. In measurement steps (A), (C), (E), and (G), the $V_{AC}$ ($V_{sq}$) is turned on at a selected waveform to measure the surface potential with the probe tip 12 at a predetermined height just outside of tunneling range. The $V_{AC}$ is then turned off and the $V_{Ramp}$ voltage is turned on. The steps (B), (D), and (F) show sequential increases in the applied $V_{Ramp}$ voltage. However, multiple measurement cycles may be made at the same probe tip gap before the applied $V_{Ramp}$ voltage is ramped to a new value. It will be appreciated that the voltage ramp $V_{Ramp}$ may start at a high initial value and be decreasing in value instead of increasing in value from low initial value. The probe tip 12 is lowered to gap Z within tunneling range, and the applied $V_{Ramp}$ voltage induces tunneling. The probe tip 12 is then retracted to the predetermined height beyond tunneling range for re-measuring the surface potential. If an electron has tunneled, the surface potential measured before and after tunneling will be different. The difference in surface potential is proportional to the amount of charge that has tunneled to or from the surface. The q graph indicates the charge injected into the dielectric surface during tunneling attempts. The measurement of surface potential is carried out at the same tip-sample gap. The measured surface potential doesn't depend on the applied tunneling voltage. The graph SP indicates the measured surface potential. The charge under the probe tip 12 is inferred from the surface potential changes, so that a spectrum of where the tunneling events have occurred can be found by plotting surface potential changes versus the applied $V_{Ramp}$ voltage. It will be appreciated that FIG. 13 is illustrative for positive $V_{Ramp}$ voltages, but the general correlation of waveforms would be similar for negative $V_{Ramp}$ voltages.

The acquisition of the surface potential measurement relies on the square wave voltage ($V_{sq}$) to cause a change of the resonant frequency of the probe 14 dependent on the surface potential of the sample dielectric material 30. The average surface potential on the sample dielectric material 30 at the particular location of measurement affects the modulation of the resonant frequency of the probe arm 14. The change in resonant frequency of the probe arm 14 is measured by the frequency modulation detector 20. Thus, the result of a different average surface potential on the dielectric material 30 at the selected location where the surface potential is measured causes the output of the frequency modulation detector 20 having a square wave output with an amplitude that is proportional to the difference between the average surface potential of the probe tip 12 and the average surface potential of the sample dielectric material 30 at the selected location. This square wave output will be detected by the lock-in amplifier 24 and can be used as a measurement of surface potential that is conveyed as surface potential signal 35 to the computer 34.

Figure 14:
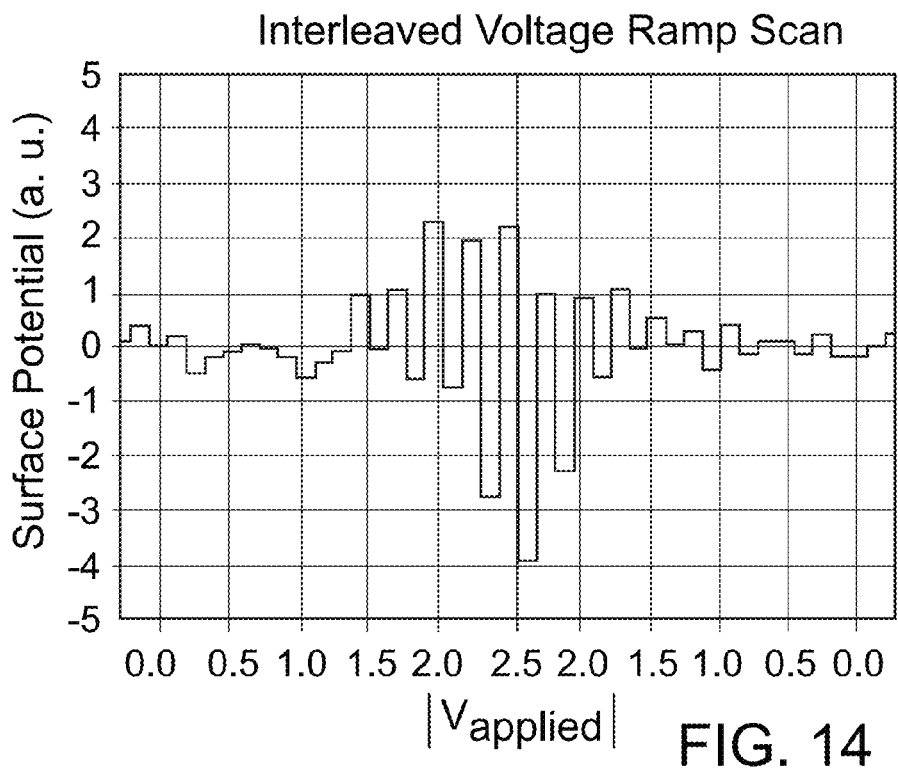
FIG. 14 illustrates some additional measured surface potential data with respect to the magnitude of the applied bipolar voltage.

FIG. 14 is a graph of surface potential plotted against the magnitude of a bipolar voltage applied to a sample dielectric material 30 of 4 nm of $HfSiO_x$ over 0.7 nm of $SiO_2$. The figure illustrates some additional measured surface potential data with respect to the magnitude of the applied voltage. The data was acquired over a single point or location on the sample dielectric material 30. By ramping the applied voltage and alternating the sign of the voltage (switching the polarity) each time the probe tip 12 comes within tunneling range of the sample dielectric material 30, the integrated density of trap states on either side of the flat band equilibrium condition can be found by plotting the surface potential against each applied voltage value. The left half of the interleaved voltage ramp represents both a voltage ramp from 0 to +2.5 and from 0 to −2.5 volts.

Figure 15:
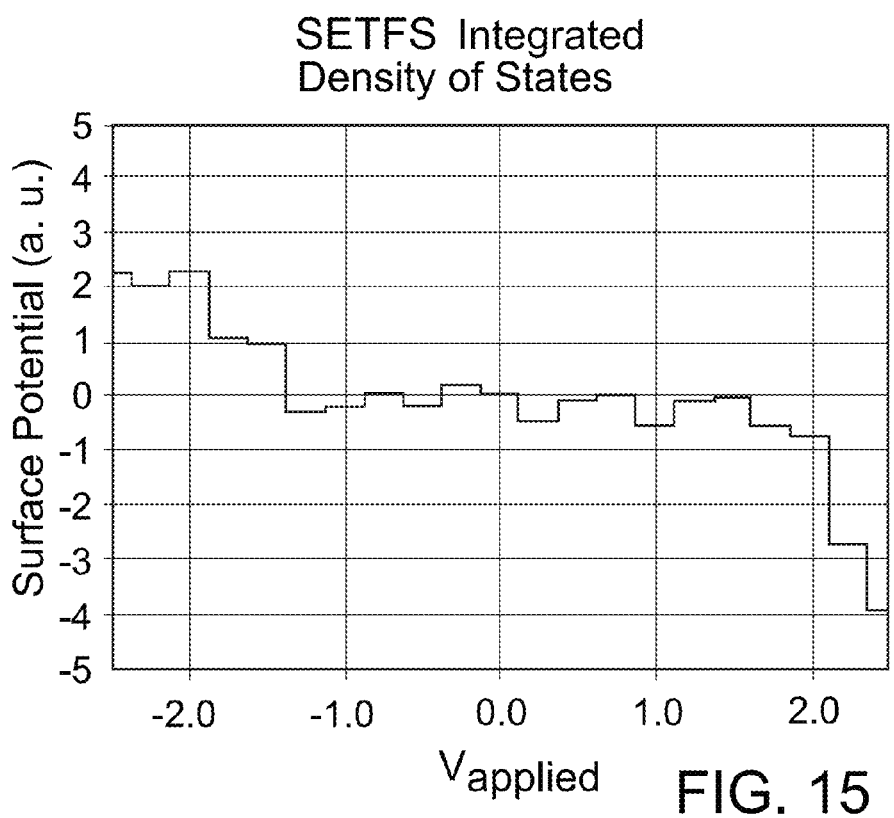
FIG. 15 is a graph showing integrated data from FIG. 14.

The graph shown in FIG. 15 is created by separating the surface potentials measured after the interleaved ramp up and down on the left half of FIG. 14. The data in FIG. 15 shows that many electrons may shuttle (more than 1 electron), each time the voltage polarity is reversed, indicating that there are many trap states within tunneling range of the probe tip 12. The tunneling calculations show that when the tip-sample gap is 0.4 nm, tunneling can occur to states that are as far as 4 nm below the surface of the $HfSiO_x$ sample dielectric material 30. Therefore, the spectroscopy measurements are sampling the entire volume of the $HfSiO_x$ film above the 0.7 nm $SiO_2$ layer.

Figure 16A:
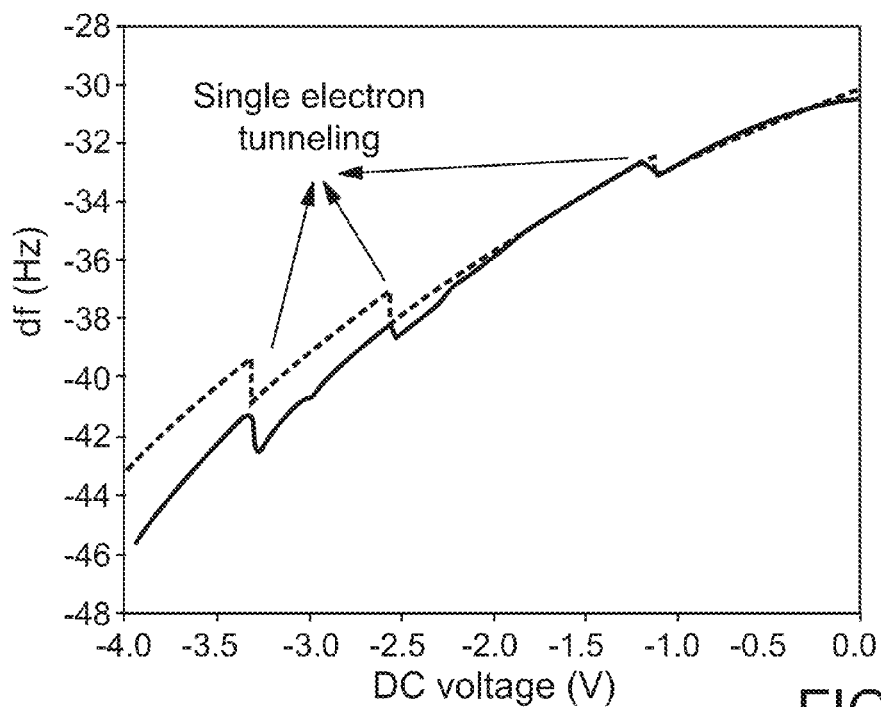
FIGS. 16A and 16B are graphs of frequency shift versus voltage.
Figure 16B:
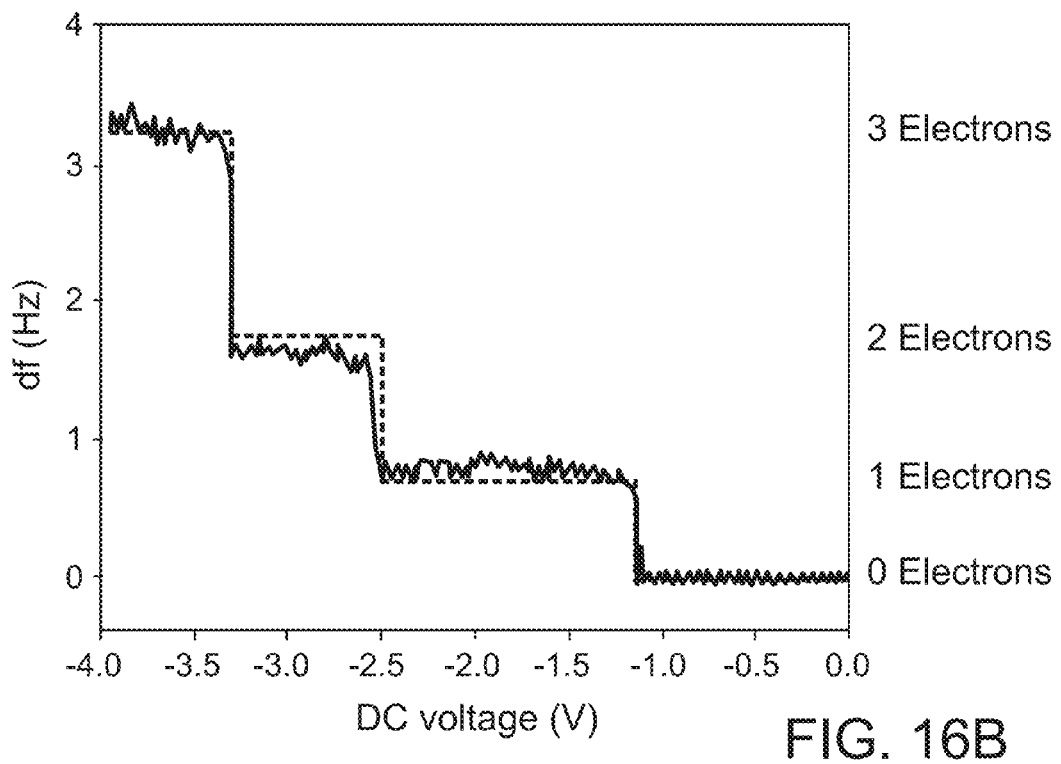

A simple ramped spectroscopic method provides another technique for spectrographic measurements with height control. In the simple ramped method, the voltage ramp is applied and df is measured directly, without need to push the probe tip 12 toward the surface so there is no need to measure before and after such feedback steps. One tradeoff of this spectroscopic method is that the sensitivity to a single-electron tunneling event depends approximately linearly on the applied voltage (frequency shift due to the electron tunneling event depends on the applied electric field). FIGS. 16A and 16B are graphs of frequency versus voltage that suggests that the size of an electron tunneling event depends nearly linearly on the applied voltage, which makes monitoring the probe frequency shift during simple voltage ramps less sensitive to tunneling events to states near the center of the dielectric band gap. This means that for states that are near the center of the band gap of the dielectric, which require only small voltages to align the tip Fermi level with the state energy, can be difficult to detect. Nevertheless this simple ramped spectroscopic approach is easy to implement and fast to perform and may be desirable for some applications.

Figure 17:
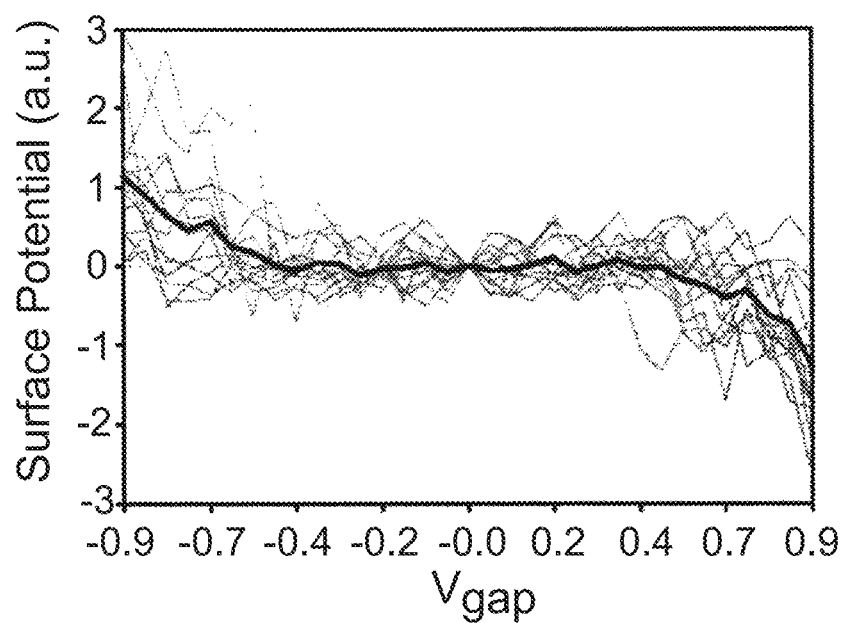
FIG. 17 is a graph of surface potential versus voltage of the gap for multiple spectroscopic scans acquired at a single location.

Many spectroscopic scans acquired at the same location on the surface show some random noise. This is likely due to quasi-static charge fluctuations at the dielectric surface that are independent of the applied voltage. It is observed that both the energy where the first electrons begin tunneling as well as the magnitude of the surface potential changes at higher applied voltages exhibit noise. However, averaging of the individual scans provides a meaningful spectrum, shown in bold in the graph below. This charge variation and other noise is likely to be eliminated by selection of appropriate cleaning and other techniques known to skilled practitioners. FIG. 17 is a graph of surface potential versus voltage of the gap for multiple spectroscopic scans acquired at a single location on the sample dielectric material 30. The thinner lighter curves show variations in the measured surface potential, and the thick darker curve is the average surface potential versus Vgap at the single location.

Figure 18:
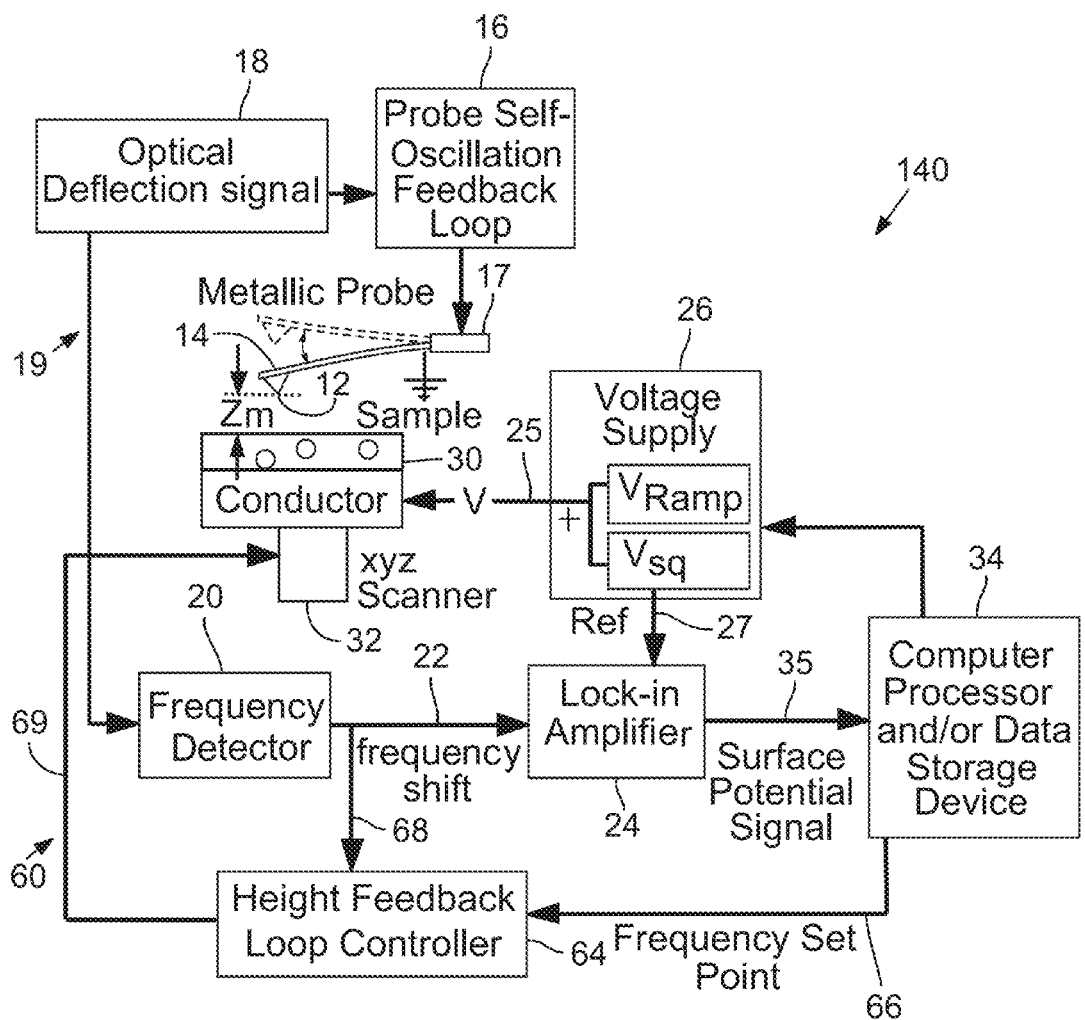
FIG. 18 is a simplified diagram of an SETFS system employing a height control feedback loop.

FIG. 18 is a simplified diagram of an SETFS system 140 employing a height control feedback loop 60 that employs many components analogous to those employed in the DTFM system 50 shown in FIG. 5. Accordingly, the analogous components are labeled with the same reference numerals and their functions are not described again for brevity.

One simple approach to height control in SETFS is to allow the probe tip 12 to touch the surface of the sample dielectric material 30 before tunneling is attempted at each selected location on the sample dielectric material 30. The contact of the probe tip 12 permits a direct and immediate indication of the exact height of the surface at the location selected for tunneling examination. The probe tip 12 can then be elevated to the desired height to perform the tunneling measurements for each of the voltage runs. The height control feedback loop 60 can be activated before or during relative movement of the probe tip 12 to the sample dielectric material 30 to position the probe tip 12 at the selected location on the surface of the dielectric material 30, or the height control feedback loop 60 can be activated after the probe tip 12 reaches the selected location.

Figure 19:
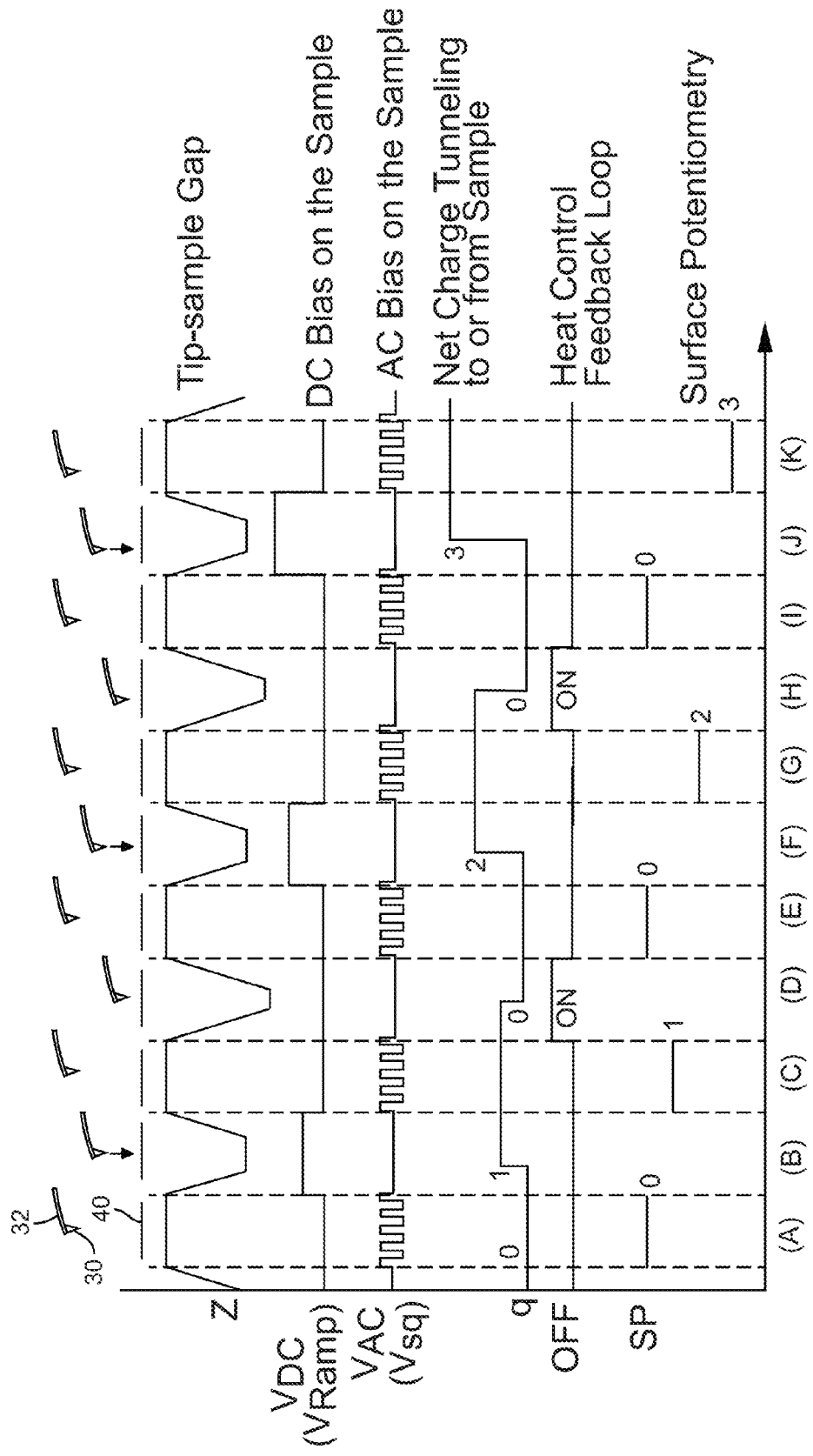
FIG. 19 is a diagram correlating changes in applied voltage and changes of tip-sample gap as correlated with an exemplary point lift height control methodology for performing SETFS measurements.

FIG. 19 is a diagram correlating changes in applied voltage and changes of tip-sample gap as correlated with an exemplary point lift height control methodology for performing SETFS measurements. The tip-sample gap versus applied voltage diagram of FIG. 20 provides an illustration of exemplary steps (A) through (K) of SETFS scans at different tip-sample voltages. FIG. 20 bears some resemblance to FIG. 13, so the description of analogous measurement steps will be abbreviated.

The probe tip 12 is pictorially to be either in tunneling range, out of tunneling range, or pushed in further toward the sample dielectric material 30 when the height control feedback loop 60 is engaged. Similarly, the graph of Z indicates movement of the probe tip 12 to set its height with respect to the surface of the sample dielectric material 30. In measurement steps (A), (C), (E), (G), (I) and (K) the $V_{AC}$ is turned on at a selected waveform to measure the surface potential with the probe tip 12 at a predetermined height just outside of tunneling range. The $V_{AC}$ is then turned off and the $V_{Ramp}$ voltage is turned on during steps (B), (F), and (J). The steps (B), (F), and (J) show sequential increases in the applied $V_{Ramp}$ voltage. Steps (D) and (H) show the steps in which the feedback loop is on with the probe tip 12 close to the surface of the sample dielectric material 30.

The probe tip 12 is lowered to gap Z within tunneling range, and the applied $V_{Ramp}$ voltage induces tunneling. The probe tip 12 is then retracted to the predetermined height beyond tunneling range for re-measuring the surface potential. The q graph indicates the charge injected into the dielectric surface during tunneling attempts. The measurement of surface potential is carried out at the same tip-sample gap. The graph SP indicates the measured surface potential.

However, between the tunneling steps (B), (F), and (J), the height control feedback loop 60 is engaged in steps (D) and (H) while the $V_{AC}$ and the $V_{Ramp}$ voltage are then turned off. The point lift height control for SETFS resembles the point lift height control for DTFM.

Figure 10:
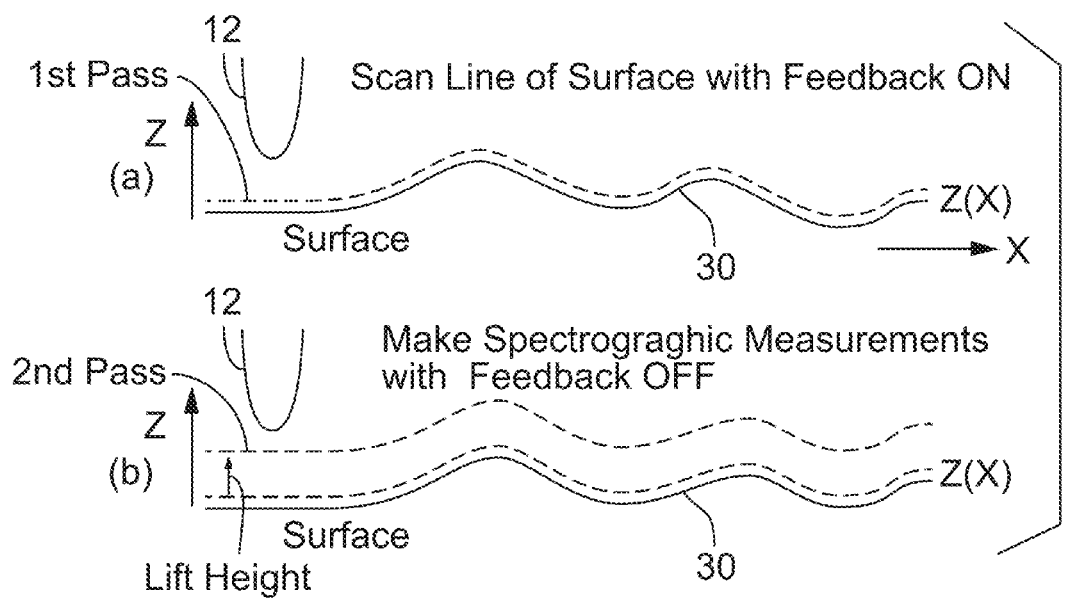
FIG. 10 illustrates exemplary steps for height control in a line lift mode.

Similarly, SETFS height control could employ a line lift mode that resembles the line lift mode employed for DTFM such as shown in FIG. 10 with the topographic line acquisition preceding a line of SETFS measurements.

Additional details concerning height control feedback for SETFS, and in particular with respect to energy and depth characterization of electronic trap states through the use of height control, can be found in the concurrently filed international application for "Measurement of Depth and Energy of Buried Trap States in Dielectric Films by Single Electron Tunneling Force Spectroscopy" of the inventors Clayton Covey Williams and Jon Paul Johnson, which is herein incorporated by reference.

Another way to implement the scans would be to utilize dynamic tunneling force spectroscopy, such as described in "Atomic Scale Imaging and Spectroscopy of Individual Electron Trap States Using Force Detected Dynamic Tunneling," by Johnson, J. P.; Zheng, N.; Williams, C. C. *Nanotechnology* 2009, 20, 055701. This adaptation would have the benefit of performing the voltage spectroscopy measurement at a higher speed, avoiding the separate surface potential measurements, applications of tunneling voltage, and inward and outward probe tip movements at each voltage step. The previous height control methodology could be used except that dynamic tunneling force spectroscopy would be used instead of the slower stepped voltage SETFS.

It will be obvious to those having skill in the art that many changes may be made to the details of the above-described embodiments without departing from the underlying principles of the invention. The scope of the present invention should, therefore, be determined only by the following claims.

What is claimed:

1. A method for height control of a probe tip during imaging by dynamic tunneling force microscopy on a surface of a dielectric material, comprising:

performing imaging by dynamic tunneling force microscopy;

measuring a surface potential difference between the probe tip and a local region of a surface of the dielectric material with a lock-in amplifier to obtain a deviation signal;

adjusting a feedback loop in response to the deviation signal to control a voltage applied to the probe tip to maintain electrical potential at the probe tip that is the same as an electrical potential at the local region of the surface of the dielectric material, thereby eliminating or reducing effects of surface potential variations on the surface of the dielectric material;

monitoring or measuring oscillation frequency of a cantilever with respect to a set point, the cantilever supporting the probe tip; and adjusting the height of the probe tip in response to shifts in the oscillation frequency of the cantilever caused by height variation between the probe tip and the surface of the dielectric material during the imaging by dynamic tunneling force microscopy, to compensate for height variation between the probe tip and the surface of the dielectric material, thereby maintaining a constant oscillation frequency of the cantilever to maintain the height of the probe tip in relation to the surface of the dielectric material.

2. A method for a probe tip height control during imaging by dynamic tunneling force microscopy on a surface of a dielectric material, comprising:

bringing a probe tip near the surface of the dielectric material;

determining a flat band condition;

selecting a set point for a tip height control with respect to a selected amount of frequency shift during a gated time period during imaging;

scanning the tip across the surface for dynamic tunneling force microscopy (DTFM) imaging; and implementing a height control loop intermittently or regularly, optionally by turning it on and off at a rate sufficient to maintain desirable height control and such that whenever the height control loop is on, DTFM voltages are off, and whenever the height control loop is off, the DTFM voltages are on.

3. The method of claim 2, wherein the height control is gated at every location in the dynamic force tunneling image.

4. The method of claim 2, wherein the height control is gated at fewer times than the number of locations in the dynamic force tunneling image.

5. A method for controlling a height of a probe tip during acquisition of a dynamic tunneling force microscopy image, which comprises a series of dynamic electron tunneling attempts between the probe tip and a dielectric material having front and rear surfaces, comprising:

providing a probe tip attached to a cantilever arm, the probe tip having a metallic material;

oscillating the cantilever arm at an oscillation amplitude and an oscillation frequency;

positioning the probe tip at a height above the front dielectric surface determined by a frequency set point of a feedback loop;

moving the probe tip across multiple locations on the dielectric material, the multiple locations including at least first and second locations;

employing an oscillation feedback loop to maintain an oscillation frequency of the cantilever arm by adjusting the height of the probe as it scans across the surface;

measuring adjustments made by the height control feedback loop to determine a topography of the surface over multiple locations along a line including at least first and second locations;

positioning the probe at a chosen height above the front dielectric surface and scanning the probe across the same line previously imaged topographically under feedback control and using the previously obtained height information to keep the probe at a constant height above the surface, while dynamic tunneling force measurements are performed over that line on the surface;

re-engaging the height feedback loop control and moving the probe tip to a second line in the image, and measuring the topography on the second line;

positioning the probe at the chosen height above the front dielectric surface and scanning the probe across the second line using the previously obtained height information for that line, while performing dynamic tunneling force microscopy measurements; and repeating the foregoing steps for each line until a full raster scan of the region of interest is obtained.

6. The method of claim 5, wherein engaging the height feedback control further comprises using a DTFM signal with a feedback loop to keep a surface potential constant between the probe tip and the dielectric material and to employ frequency shift feedback loop control to maintain the same height of the probe tip above the dielectric material surface.

7. The method of claim 5, wherein engaging the height feedback control further comprises using a hybrid point lift mode and asynchronously pulsed to DTFM waveform mode.

8. A dynamic tunneling force microscopy system, comprising:

a probe arm;

a metallic probe tip supported by the probe arm;

a mechanical actuator for oscillating the probe arm at a probe oscillation frequency and probe oscillation amplitude;

a probe self-modulation feedback loop for maintaining oscillation of the probe arm at the probe oscillation frequency and the probe oscillation amplitude;

a positioning system for relative positioning of a sample material to the probe tip;

a frequency shift detection system that is operable for detecting an oscillation frequency shift from the probe oscillation frequency in response to electron tunneling between the probe tip and the sample material;

one or more voltage supplies for applying voltage to the sample, wherein a voltage applied includes a square wave voltage to facilitate measurement of electrical potential between the probe tip and the sample material, wherein the voltage applied also includes a DC voltage that functions to adjust potential between the probe tip and the sample material;

a height modulator to modulate a height between the probe and sample;

a first lock-in amplifier for receiving a reference signal correlated with the square wave voltage applied to the sample material, for receiving a first frequency shift signal from the frequency shift detection system, and for providing an electron tunneling signal indicative of electron tunneling between the probe tip and the sample material;

a height feedback loop controller for receiving a frequency set point for establishing a probe height value indicative of a true distance between the probe tip and the sample material, for receiving a frequency shift signal from the frequency shift detection system, and for providing a height feedback control signal to the positioning system to permit the positioning system to provide a selected distance between the probe tip and the sample material that is correlated with the true distance;

a second lock-in amplifier for receiving a second reference signal correlated with the square wave voltage applied to the sample material;

a voltage feedback loop controller for receiving a surface potential signal directly or indirectly from the second lock-in amplifier and for providing a voltage feedback signal to one or more of the voltage supplies in order to cause adjustment of the DC voltage applied to the sample during a dynamic force tunneling mode; and a computer for receiving the electron tunneling signal indicative of electron tunneling between the probe tip and the sample and for providing signals directly or indirectly to one or more of the voltage feedback loop controller, the height modulator, the height feedback loop controller, and one or more voltage supplies.

9. A method for controlling a height of a probe tip during a series of electron tunneling attempts between the probe tip and a dielectric material having front and rear surfaces, comprising:

providing a probe tip attached to a cantilever arm, the probe tip having a metallic material;

oscillating the cantilever arm at an oscillation amplitude and an oscillation frequency;

positioning the probe tip at a non-tunneling height beyond electron tunneling range at a first location on the front surface of the dielectric material;

measuring the surface potential to determine a flat-band voltage between the probe tip and an electrical contact on the rear surface of the dielectric material;

adjusting electrical potential at the probe tip to be at the flat band voltage;

moving the probe tip toward the front surface of the dielectric material to contact the front surface, movement of the probe tip causing a shift in the oscillation frequency of the cantilever arm as a function of distance between the probe tip and the front surface of the dielectric material;

selecting a first frequency set point for the oscillation frequency to establish a baseline height of the probe tip in relation to the front surface of the dielectric material at a first location;

moving the probe tip to a non-tunneling height beyond the electron tunneling range at the first location on the dielectric material;

measuring at the first location a first baseline surface potential between the probe tip and the dielectric material at the first location;

applying a first voltage between the probe tip and the dielectric material at the first location;

positioning the probe tip at a chosen tunneling height at the first location on the dielectric material to attempt electron tunneling at the first voltage between the probe tip and the dielectric material from a chosen height at the first location;

moving the probe tip to a non-tunneling height beyond the electron tunneling range at the first location on the dielectric material;

measuring at the first location a first surface potential after electron tunneling from the chosen tunneling height at the first location at the first voltage;

re-engaging a height feedback loop at the first frequency set point for the oscillation frequency to re-establish a baseline height of the probe tip in relation to the front surface of the dielectric material at the first location;

applying a second voltage between the probe tip and the dielectric material at the first location, wherein the second voltage is different from the first voltage;

moving the probe tip to the chosen tunneling height in relation to the front surface of the dielectric material at the first location as previously established by the first frequency set point;

moving the probe tip to a non-tunneling height beyond the electron tunneling range at the first location on the dielectric material;

measuring at the first location a second surface potential associated with attempted electron tunneling from the chosen tunneling height at the first location at the second voltage; and repeating with as many voltage increments as desired to perform the spectroscopic measurement, re-engaging the height feedback loop between each spectroscopic measurement or data point, or every other spectroscopic measurement or data point, or every third spectroscopic measurement or data point, or some other fraction of every spectroscopic measurement or data point to maintain an accurate probe height during the spectroscopic measurements.

10. A method for controlling distance between a probe tip and a dielectric material during electron tunneling attempts between the probe tip and the dielectric material at multiple locations on the dielectric material, comprising:

engaging a height control feedback loop;

providing relative movement of the probe tip to the dielectric material across multiple locations on the dielectric material, including first and second locations which are nonadjacent on the dielectric material;

determining a topography of the dielectric material for the first and second locations;

disengaging the height control feedback loop;

engaging a height modulator;

applying a voltage between the probe tip and the dielectric material;

providing relative movement of the probe tip to the dielectric material across the first and second locations on the dielectric material while maintaining a constant distance between the probe tip and the dielectric material base on the topography of the dielectric material for the first and second locations; and acquiring electron tunneling measurements at the first and second locations on the dielectric material.

* * * * *